Aug. 14, 1956  C. C. OSWALD  2,758,716
CHEMICAL PROPORTIONING DEVICE
Filed June 26, 1953  3 Sheets-Sheet 2
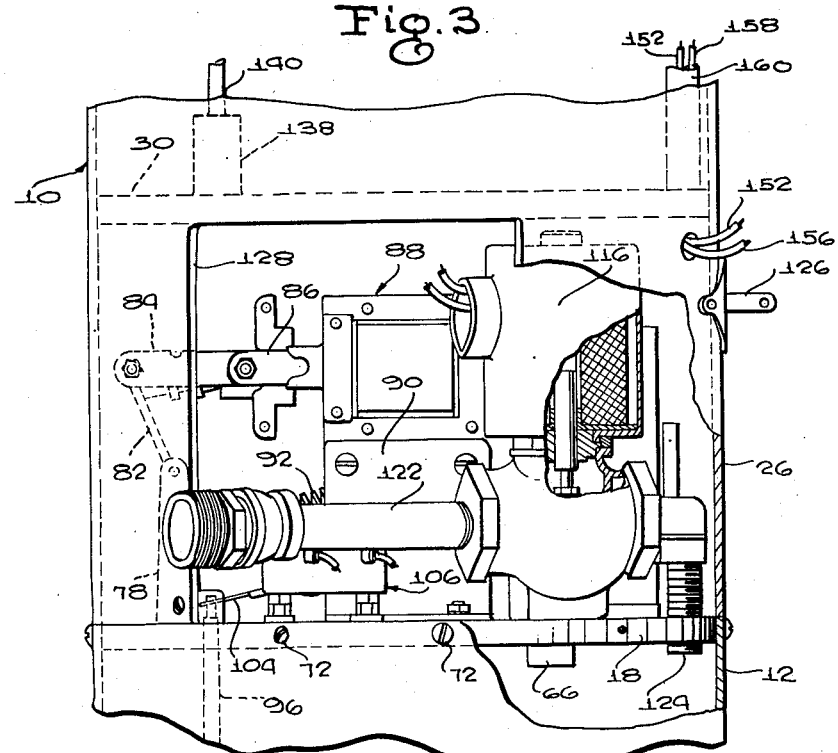
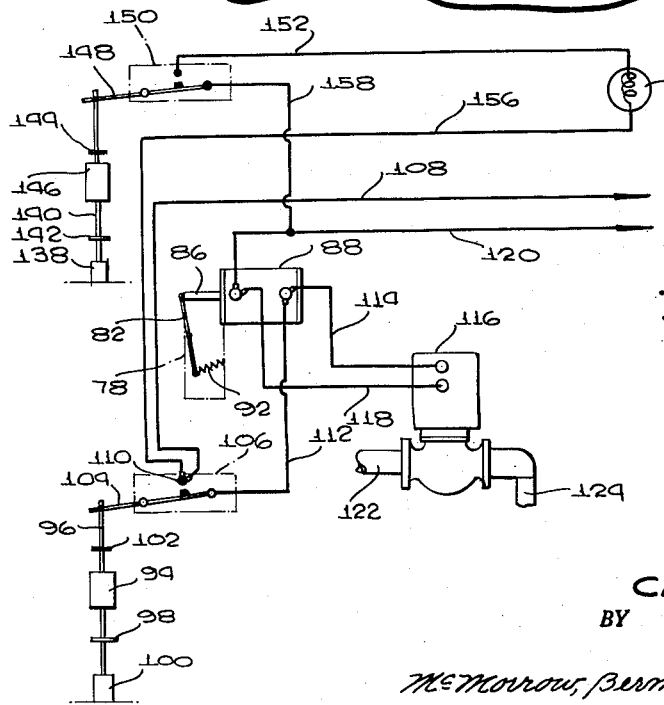
INVENTOR.
CARL C. OSWALD
BY
McMorrow, Berman + Davidson
ATTORNEYS

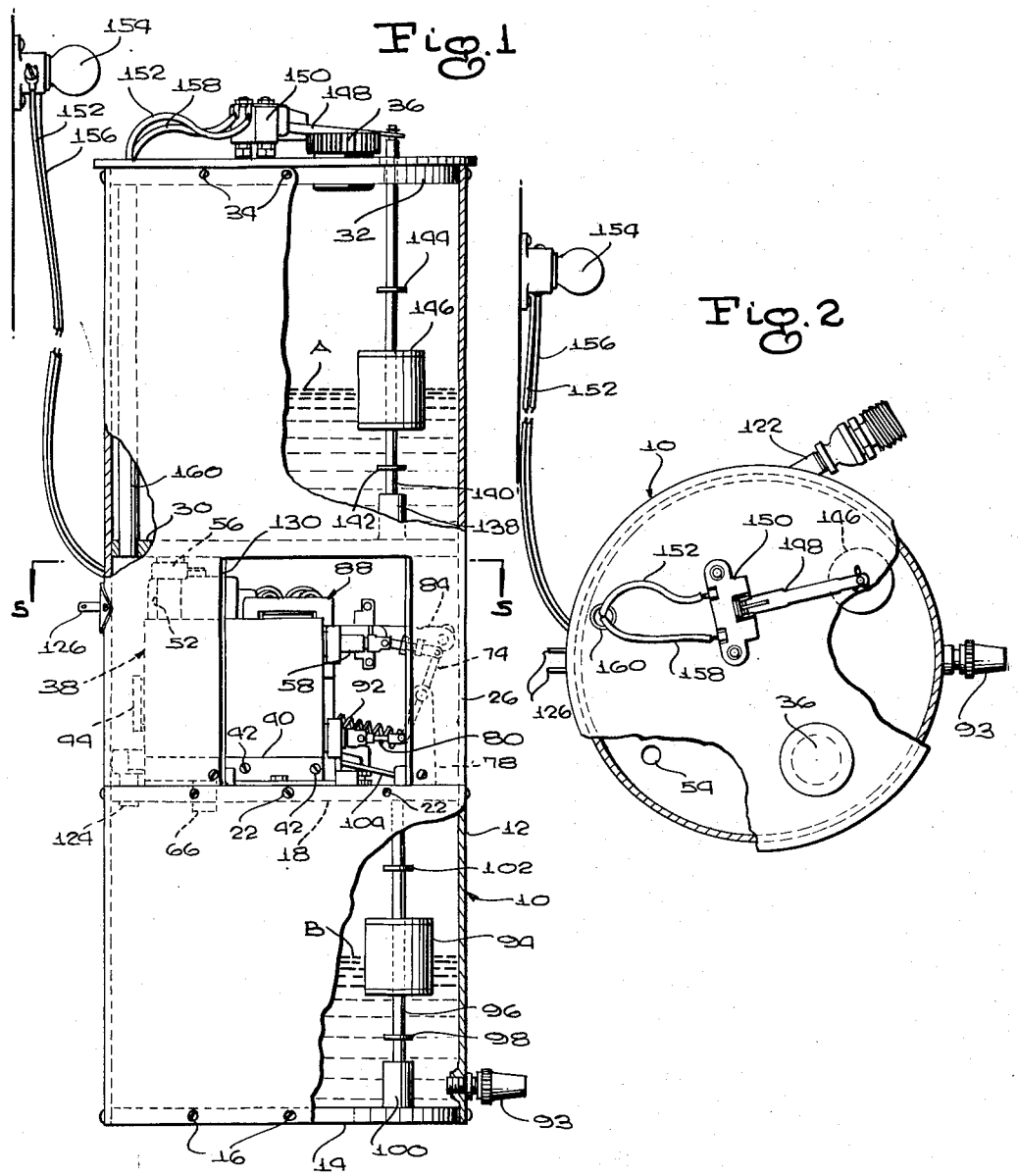

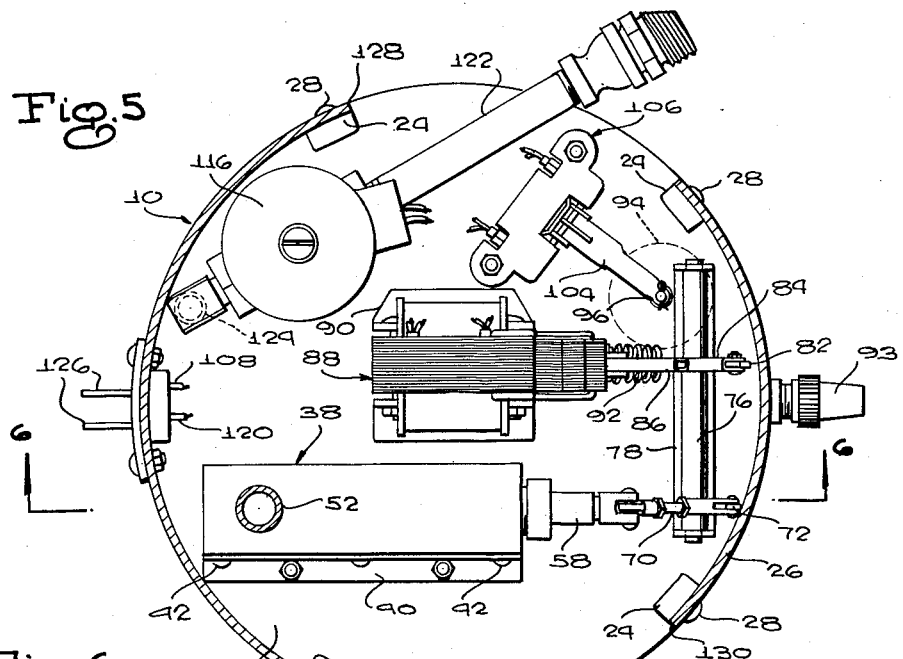
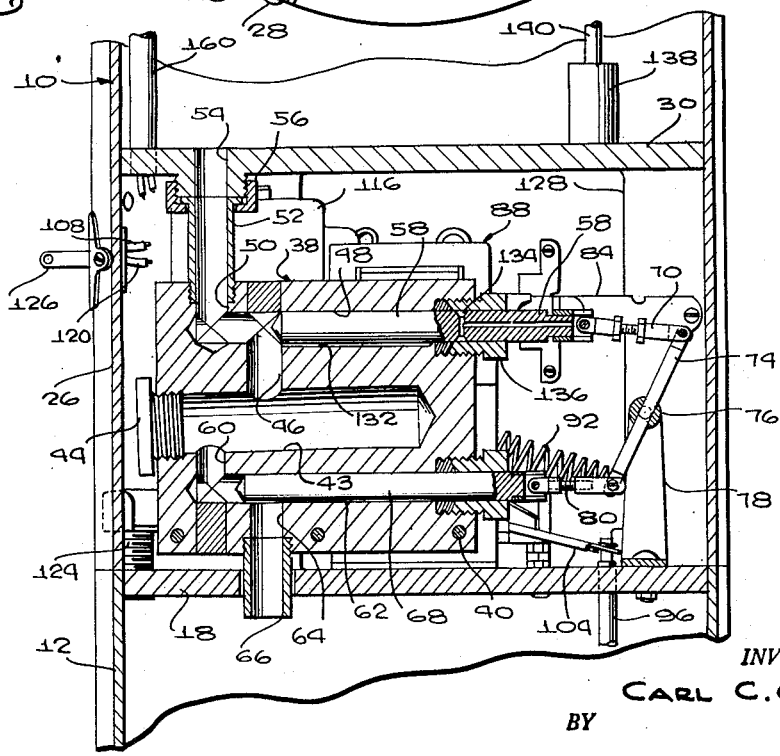

United States Patent Office 2,758,716
Patented Aug. 14, 1956

2,758,716

CHEMICAL PROPORTIONING DEVICE

Carl C. Oswald, Mechanicsburg, Pa., assignor to Richard A. Oswald, Mechanicsburg, Pa.

Application June 26, 1953, Serial No. 364,360

4 Claims. (Cl. 210—39)

This invention relates to a chemical proportioning device. More particularly, the invention has reference to a device adapted to automatically admix a given quantity of a selected liquid with a given quantity of another liquid at regular intervals.

The apparatus constituting the present invention is particularly useful as part of a water purification system. Nevertheless, the invention, as will be apparent from the description to be provided hereinafter, is not necessarily limited to such application. The apparatus can be used, it is believed, in any situation in which it is desired to mix different liquids in selected proportions, while permitting regular outflow of the mixture to a location remote from the apparatus.

Summarized briefly, the invention includes a container having upper and lower compartments, the upper compartment containing a quantity of a liquid chemical which is to be mixed at a predetermined rate with a liquid contained in the lower compartment. A measuring chamber, adapted to contain a predetermined amount of the liquid held in the upper compartment, is in communication with both compartments, and is so valved as to be out of communication with one compartment while in communication with the other compartment, and vice versa. Float means is contained within the compartment in which the liquids are to be mixed, and is adapted to control electrical circuits in such a way as to cause the measuring chamber to be emptied into the second compartment each time said second compartment is being filled to a predetermined level, lowering of said level to a predetermined extent being adapted to institute refilling of the second or lower compartment simultaneously with emptying of the measuring chamber contents thereinto.

Other objects will appear from the following description, the claims appended thereto, and from the annexed drawings, in which like reference characters designate like parts throughout the several views, and wherein:

Figure 1 is a view of a proportioning apparatus formed in accordance with the present invention in which said apparatus is viewed mainly in side elevation, the apparatus being shown partially in longitudinal section;

Figure 2 is a top plan view in which portions of the cover are broken away;

Figure 3 is an enlarged, fragmentary side elevational view of the mid-length portion of the apparatus as it appears when viewed from the side opposite that shown in Figure 1, portions being broken away and other portions being shown in section;

Figure 4 is a diagram of the electrical circuit embodied in the invention;

Figure 5 is an enlarged transverse sectional view taken on line 5—5 of Figure 1; and Figure 6 is an enlarged longitudinal sectional view taken on line 6—6 of Figure 5.

Referring to the drawings in detail, the reference numeral 10 has been applied generally to an elongated, upstanding, cylindrical container. The container 10 is of sectional formation, the component parts of the container being, however, rigidly connected.

Thus, the container includes a lower section 12 of cylindrical formation, the section 12 being closed at its bottom end by a bottom plate 14 secured fixedly, at locations spaced circumferentially thereof, to the bottom end edge of the section 12 by screws 16 or equivalent fastening elements.

At its upper end, the lower section 12 is closed by a lower partition 18, secured fixedly by screws 22 to the upper end edge of the section 12, at locations spaced equidistantly about the circumferences of the partition and lower section.

Referring to Figure 5, a plurality of lugs 24 are integral or otherwise made rigid with the marginal portion of the top surface of the partition 18, said lugs engaging against the inner surface of an upper section 26 of the container, at the lower end edge of said upper section.

The upper section 26 is of cylindrical formation, being formed to the same diameter as and being aligned coaxially with the bottom section 12. The upper section 26, as will be noted from Figure 1, extends from the upper end of the bottom section 12 to the upper end of the container 10.

Extending through the wall of the upper section 26 are screws 28, said screws being threaded into the several lugs 24, thus to secure the upper and lower sections fixedly to one another and to the lower partition 18.

An upper partition 30 is spaced above the lower partition 18, and closing the upper end of the cylindrical section 26 of the container is a flanged cover 32 fixedly secured to said section 26 by screws 34 or the like.

It will be seen from the above that the construction of the container is such as to define, therewithin, an upper liquid compartment, a lower compartment, and a valve compartment disposed therebetween, said valve compartment being defined between the partitions 18, 30.

In the cover 32 I form a threaded opening, receiving a complementarily threaded filler plug 36, said plug being removable to permit the upper compartment of the apparatus to be filled with a liquid A, which liquid can comprise a suitable chemical intended to be admixed, at a predetermined rate, with a second liquid B fed to the lower compartment of the apparatus.

Within the valve compartment defined between the partitions 18, 30 I mount a measuring valve block designated generally by the reference numeral 38. The block 38 can be formed from a solid piece of plastic or other non-corrosive material, and it may be noted at this point that the entire apparatus is so designed as not to be subject to the corrosive effects of liquid chemicals fed therethrough. Thus, it is preferred that the container 10 be formed of a transparent plastic material throughout, so that the operation of the apparatus will be visible at all times.

In any event, the block 38 is fixedly secured within the valve compartment by means of an angle bar 40, said bar 40 being attached rigidly to the bottom end of the upstanding valve block by means of screws 42 (Figures 1 and 5) and being also attached fixedly to the partition 18.

The inner construction of the block 38 is shown to particular advantage in Figure 6. As will be noted in this figure of the drawing, the block 38 is formed, intermediate its upper and lower ends, with a relatively elongated, cylindrical measuring chamber 43, said chamber being slightly inclined, so as to cause any liquid deposited therein to flow in the direction of the left-hand end of the chamber, viewing said chamber as it appears in Figure 6.

The chamber 43 is normally closed at its opposite ends during operation of the apparatus, but access to the interior thereof can be allowed by a removable plug 44 having external threads engaging complementary threads formed in the wall of the chamber 43.

Communicating with the chamber 43, intermediate the opposite ends thereof, is an inlet passage 46, said passage extending vertically within the block 38, and being in communication, at its upper end, with an inlet valve plunger bore 48. The valve plunger bore 48, at one end, is in continuous communication with an inlet opening 50 formed in the upper end of the block 38, said inlet opening 50 extending vertically within the block but being offset from and in parallelism with the inlet passage 46.

The inlet opening 50 has internal threads formed therein, engaging threads provided upon the lower end of an inlet tube 52 extending vertically and upwardly from the block 38, said tube 52 being coaxially aligned with and in continuous communication with an outlet opening 54, that is formed in a depending, externally threaded boss integrally provided upon the underside of the upper partition 30. A spanner nut 56 is threadable upon the boss, and engages the flange at the upper end of the tube 52, thus to hold the tube assembled with the partition 30.

Slidably reciprocable within the bore 48 is an inlet valve plunger 58, the valve plunger being supported in the plug 136. As will be noted from Figure 6, when the plunger 58 is moved to one extreme position within the bore 48, communication is established between the upper compartment of the apparatus and the measuring chamber 43. When, however, the inlet valve plunger 58 is shifted to the left in Figure 6, to its opposite extreme position, it closes the inlet of the measuring chamber 43.

Communicating with the measuring chamber 43, and extending downwardly therefrom adjacent one end of the measuring chamber, is an outlet passage 60, in communication at its lower end with a horizontally extended outlet valve plunger bore 62. In communication with the bore 62, intermediate opposite ends of the bore, is a downwardly extending outlet opening 64. The opening 64 is in communication with a nipple 66 threaded into the lower end of the block 38 and opening into the lower compartment of the apparatus.

Slidably reciprocable in the bore 62 is an outlet valve plunger 68, said plunger 68 being shiftable between opposite extreme positions in one of which it closes the outlet of the measuring chamber 43, thus to close the chamber 43 out of communication with the lower compartment of the apparatus, and in the other of which it opens the measuring chamber outlet.

When the inlet valve plunger 58 is in its open position, at the right-hand extreme of its travel, the outlet valve plunger 68 is in its closed position, at the left-hand extreme of its travel. The plungers 58, 68 are shown in these particular extreme positions in Figure 6.

The plunger 58 has one end thereof extended beyond one side of the block 38, and pivotally connected to the projecting end of the inlet valve plunger 58 is one end of an adjustably extensible link 70, that is pivotally joined at its other end to the upper end of a swingable plunger-actuating arm 74.

The arm 74 oscillates in a vertical plane, and is rigid, medially between its ends, with a horizontally disposed rock shaft 76 journaled at its opposite ends in the upper ends of the upstanding legs of a U-shaped rock shaft support bracket 78.

At its lower end, the arm 74 is pivotally connected to one end of an adjustably extensible connecting link 80, said link 80 being connected pivotally at its other end to the outer end of the outlet valve plunger 68.

It may be noted that at their outer ends, the plungers 68 extend through packing glands, thus to prevent leakage of fluid through the plunger bores.

By reason of the construction so far illustrated and described, it will be apparent that when the arm 74 is swung clockwise in Figure 6, to the position in which said arm is shown in the figure, the inlet valve plunger 58 will be shifted to open position simultaneously with movement of the plunger 68 to a closing position. Counterclockwise movement of the arm 74 is adapted to effect reversal of the plunger positions.

Referring to Figure 5, a rock shaft actuating arm 82 is rigid, medially between its ends, with the rock shaft 76, at a location spaced longitudinally of the rock shaft from the arm 74.

A link 84 is pivotally connected at one end to the upper end of the arm 82, said link being pivotally connected at its other end to the outer end of the core 86 of a solenoid 88 adjustably mounted upon a supporting bracket 90 secured fixedly to the lower partition 18.

A spring 92 is hooked at one end to the bracket 90, said spring being hooked at its other end to the lower end of the rock shaft actuating arm 82.

When the solenoid is energized, it swings the rock shaft actuating arm 82 counterclockwise in Figure 6, thus to close the measuring chamber inlet while opening the measuring chamber outlet, thereby to permit flow of a quantity of liquid A held within the measuring chamber, to the lower compartment of the apparatus. When the solenoid is de-energized, the spring 92, tending to compress, swings the arm 82 in a clockwise direction, shifting the plungers 58, 68 to the positions shown in Figure 6, thereby to close the measuring chamber outlet while simultaneously opening the measuring chamber inlet. In this position of the plungers 58, 68, communication is established between the upper compartment of the apparatus and the measuring chamber, thus to permit the measuring chamber to be refilled with a predetermined quantity of liquid A contained in the upper compartment.

In the lower end of the lower compartment, an outlet 93 is provided, said lower compartment outlet being adapted to permit continuous emptying of the mixed liquids A and B from the lower compartment.

Vertically shiftable in the lower compartment (Figure 1) is a lower float 94, said lower float 94 being freely slidable upon a vertically disposed lower guide rod 96 having, adjacent its lower end, a lower stop collar 98. The lower end of the rod 96 is loosely positioned within a socket 100 integral or otherwise made rigid with the bottom plate 14.

Fixedly attached to the rod 96, in spaced relation to the upper end of the float 94, is an abutment 102. As a result, when the float 94 rises within the lower compartment, it will engage the abutment 102, and continued upward movement of the float 94 will be effective to cause upward movement, conjointly therewith, of the rod 96. The stop collar 98, of course, limits downward movement of the float 94 upon the rod when the level of liquid B drops within the lower compartment.

Pivotally connected to the upper end of the rod 96 (see Figures 5 and 6) is a vertically swingable switch arm 104, said arm extending from an electric switch designated generally at 106, which switch is fixedly mounted upon the lower partition.

When the rod 96 is raised by the float 94, the switch arm 104 will be swung upwardly at that end thereof connected to rod 96, and will open a circuit including a lead 108 extending from a suitable source of electricity. Reference should now be had to the diagram shown in Figure 4, wherein it is shown that the lead 108 extends to a switch terminal 110 engageable by the arm 104 when the rod 96 is lowered within the lower compartment by dropping of the float 94.

Extending from the arm 104 is a lead 112, said lead 112 extending to the solenoid 88. At the solenoid 88, the lead 112 is connected electrically to a lead 114, extending to a magnetically controlled valve 116. From the other side of the valve 116 extends a lead 118, said lead 118 extending to the other terminal of the solenoid 88. A lead 120 extends from said other terminal of the solenoid, back to the source of power.

The magnetically controlled valve 116 is adapted to control the flow through a main fluid supply line 122, having a spout 124 that empties into the lower compartment of the apparatus.

Through the main fluid supply line 122, there will be fed a liquid B, which liquid B will be discharged through the spout 124 into the lower compartment, to be admixed in a selected ratio with liquid A gravitating into the lower compartment from the measuring chamber 43.

It will thus be seen that when the lower compartment empties through the lower compartment outlet 93, to a predetermined extent, the rod 96 will shift downwardly, closing switch 106. Switch 106 will be closed, as will be apparent, as soon as float 94 moves downwardly relative to the guide rod 96, to a predetermined extent, responsive to dropping of the level within the lower compartment.

Closing of the switch 106 will be effective to energize the solenoid 88 and the magnetically controlled valve 116. In this connection, valve 116 is so arranged as to be in its open position when energized, and in its closed position when deenergized. Thus, whenever the valve 116 is energized, liquid B flows into the lower compartment through the main line 122.

As a result, closing of the switch 106 will, in the first instance, be effective to energize the solenoid 88, opening the outlet of the measuring chamber 43 while preventing communication between the measuring chamber and the upper compartment having the chemical A. The measuring chamber accordingly releases a selected amount of said chemical A into the lower compartment, while the lower compartment is being filled with the liquid B, thus assuring a uniform mix, since spout 124 is discharging at the side of the lower compartment, thus causing a rolling motion of the liquid B. The placement of valve 116 at the side of the lower compartment is specifically intended to cause said rolling motion.

As soon as the lower compartment fills with liquid B to a predetermined extent, the float 94 will shift the rod 96 upwardly, opening the switch 106, as a result of which the solenoid 88 is de-energized, closing the measuring chamber outlet and opening its inlet for refilling of the measuring chamber, while simultaneously de-energizing valve 116 to prevent further flow of liquid B into the lower compartment.

It will thus be seen that the electrical controls of the apparatus are so arranged as to cause a predetermined amount of liquid chamical A to be deposited in the liquid B, at prescribed time intervals, the amount of liquid A mixed with liquid B being previously determined, according to the rate of flow of liquid B from the lower compartment.

It will be understood that the connection of the electrical circuit with a suitable source of electric power can be effected by means of conventional prongs 126 secured to the container 10, said prongs being connected to the leads 108, 120 respectively.

Further, it is desirable that access be provided to the interior of the valve block compartment, and accordingly, substantially diametrically opposite openings 128, 130 (Figures 1 and 5) are formed in the wall of the container, said openings being quite large.

It may be noted that to permit the measuring chamber 43 to empty, it is necessary that it be exposed to atmospheric pressure. Accordingly, and referring once again to Figure 6, I form a longitudinal vent groove 132, communicating with the inlet valve plunger bore 48, and extending from the inlet passage 46 to a location barely short of the packing gland associated with said inlet valve plunger. In the plunger I provide a circumferential groove 134, and communicating at one end with the groove 134 is the plug 136, the other end of which is open to atmosphere at the outer or projecting end of the inlet valve plunger.

When the inlet valve plunger 58 is in the position thereof shown in Figure 6, the groove 132 is out of communication with the groove 134, and no possibility of leakage through said grooves exists, while the measuring chamber 43 is being filled.

When, however, the inlet valve plunger 58 is shifted to its opposite extreme position, and the measuring chamber 43 is being emptied, the groove 134 will have been brought into communication with the groove 132, so that there is a vent passage extending fully from the inlet passage 46 of the measuring chamber to atmosphere.

Integrally or otherwise fixedly mounted upon the upper partition 30, within the upper compartment of the apparatus, is a guide rod socket 138, in which is loosely positioned the lower end of a vertically reciprocable upper guide rod 140. The guide rod 140 (Figure 1) has, adjacent its lower end, a circumferential stop collar 142. In spaced relation to the collar 142 is an upper stop collar 144.

An upper float 146 is freely slidable upon the guide rod 140, and will shift upwardly and downwardly responsive to rising and falling of the level of the chemical A.

The rod 140 will, when the float 146 moves upwardly and engages the upper collar 144, be shifted upwardly with the float, and as a result, will swing upwardly one end of a switch arm 148, that is pivotally connected at said one end to the upper end of the rod 140. The switch arm 148 is a part of a conventional switch 150 mounted upon the cover 32. As will be noted from the electrical diagram shown in Figure 4, from one terminal of the switch 50 extends a lead 152, said lead extending to one side of an electrical signal device such as a lamp bulb 154. From the other side of the bulb 154 extends a lead 156, said lead 156 extending to the terminal 110, to provide a connection of the lead 156 to the supply lead 108. The other supply lead 120 is connected to a lead 158 extending to the other terminal of the switch 150. Said other terminal of the switch 150 is connected, as shown in Figure 4, to the swingable arm 148.

By reason of this arrangement, when the rod 140 is shifted upwardly by the float 146, the arm 148 will be swung to a contact-opening position, thereby to open a circuit to and including a bulb 154.

The purpose of the arrangement discussed immediately above is to signal, to an operator, the condition of the liquid chemical A contained in the upper compartment of the apparatus. It will be apparent that when the level of said chemical A drops beyond a predetermined extent, the bulb 154 will light, and the operator of the mechanism will thus be informed of the necessity of replenishing the chemical A.

It may be noted that means can be provided for extending the leads 152, 158 through the upper compartment without possibility of their electrically affecting or being affected by the liquid chemical A. To this end, a tube 160 extends between the cover 32 and the upper partition 30, the leads 152, 158 extending through said tube.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. Apparatus for mixing liquids in selected proportions, comprising: a container having upper and lower liquid compartments; a valve block disposed between the compartments and having a measuring chamber, an inlet passage communicating between the chamber and upper compartment, and an outlet passage communicating between the chamber and lower compartment; inlet and outlet valve plungers slidably reciprocable in said block in the inlet and outlet passages respectively; means linking the plungers for simultaneous movement between opposite extreme positions in one of which they close the outlet passage while simultaneously opening the inlet passage, for refilling of the chamber with liquid from the upper compartment, and in the other of which they open the outlet passage while simultaneously closing the inlet passage, thus to empty the contents of the measuring chamber into the lower compartment; a main valve for refilling the lower compartment and adapted for movement between open and closed positions; and means electrically actuating the plungers and main valve to the respective positions thereof, said means operating responsive to rising and falling of the liquid level in said lower compartment.

2. Apparatus for mixing liquids in selected proportions, comprising: a container having upper and lower liquid compartments; a valve block disposed between the compartments and having a measuring chamber, an inlet passage communicating between the chamber and upper compartment, and an outlet passage communicating between the chamber and lower compartment; inlet and outlet valve plungers slidably reciprocable in said block in the inlet and outet passagees respectively; means linking the plungers for simultaneous movement between opposite extreme positions in one of which they close the outlet passage while simultaneously opening the inlet passage, for refilling of the chamber with liquid from the upper compartment, and in the other of which they open the outlet passage while simultaneously closing the inlet passage, thus to empty the contents of the measuring chamber into the lower compartment; a main valve for refilling the lower compartment and adapted for movement between open and closed positions; and means electrically actuating the plungers and main valve to the respective positions thereof, said means operating responsive to rising and falling of the liquid level in said lower compartment, said last-named means including a float within the lower compartment and a switch actuable to open and closed positions by float.

3. Apparatus for mixing liquids in selected proportions, comprising: a container having upper and lower liquid compartments; a valve block disposed between the compartments and having a measuring chamber, an inlet passage communicating between the chamber and upper compartment, and an outlet passage communicating between the chamber and lower compartment; inlet and outlet valve plungers slidably reciprocable in said block in the inlet and outlet passages respectively; means linking the plungers for simultaneous movement between opposite extreme positions in one of which they close the outlet passage while simultaneously opening the inlet passage, for refilling of the chamber with liquid from the upper compartment, and in the other of which they open the outlet passage while simultaneously closing the inlet passage, thus to empty the contents of the measuring chamber into the lower compartment; a main valve for refilling the lower compartment and adapted for movement between open and closed positions; and means electrically actuating the plungers and main valve to the respective positions thereof, said means operating responsive to rising and falling of the liquid level in said lower compartment, said last-named means including a float within the lower compartment, a switch actuable to open and closed positions by the float, and a solenoid in circuit with the switch and connected to said plungers for operating the plungers between their opposite extreme positions responsive to energizing and de-energizing of the solenoid.

4. Apparatus for mixing liquids in selected proportions comprising a self-contained assembly including an upstanding hollow container partitioned at spaced locations vertically thereof to define an upper liquid compartment, a lower liquid compartment, and a valve compartment between the liquid compartments, said upper compartment being adapted for containing a first liquid to be admixed, at a predetermined rate, with a second liquid fed to the lower compartment, said lower compartment having an inlet passage opening thereinto through which said second liquid may be supplied to the lower compartment, and having an outlet for the admixed liquids; a valve block mounted in the valve compartment, said block having a measuring chamber, an inlet passage communicating between the measuring chamber and the lower compartment, said passages extending in an approximately vertical direction; inlet and outlet valve plungers slidably reciprocable in the block for movement transversely of and within the inlet and outlet passages respectively; an arm pivoted intermediate its ends within the valve compartment and pivotally connected at its opposite ends to the respective plungers, whereby to shift the plunger in one direction to a position closing the inlet passage while simultaneously shifting the outlet plunger in an opposite direction to a position in which it opens the outlet passage; spring means associated with said arm tensioned to normally shift the arm to a position in which the inlet and outlet plungers respectively open and close the inlet and outlet passages; a solenoid having a connection to said arm arranged to shift the arm to the first-named position thereof on energization of the solenoid, against the restraint of the spring; a main valve in the passage through which said second liquid is fed to the lower compartment, said main valve being of an electrically actuated type; switch means in circuit with said solenoid and main valve, for simultaneously energizing the solenoid and actuating the main valve to open position; and float means in the lower compartment disposed for actuating the switch means to a circuit-closing position responsive to lowering of the level of liquid in the lower compartment to a predetermined extent.

References Cited in the file of this patent
UNITED STATES PATENTS

| | | |
|---|---|---|
| 424,688 | Powers | Apr. 1, 1890 |
| 1,126,222 | Johnson et al. | Jan. 26, 1915 |
| 1,220,398 | Cox | Mar. 27, 1927 |
| 2,296,713 | Hinsch | Sept. 22, 1942 |